United States Patent
Harper-Smith

(10) Patent No.: US 7,252,037 B2
(45) Date of Patent: Aug. 7, 2007

(54) PRINTING-FACILITATING KIT

(75) Inventor: Jon Harper-Smith, East Sussex (GB)

(73) Assignee: Sericol Limited, Kent (GB)

( * ) Notice: Subject to any disclaimer, the term of this patent is extended or adjusted under 35 U.S.C. 154(b) by 1057 days.

(21) Appl. No.: 10/210,253

(22) Filed: Aug. 1, 2002

(65) Prior Publication Data

US 2004/0021881 A1   Feb. 5, 2004

(51) Int. Cl.
    *B41M 1/12* (2006.01)
(52) U.S. Cl. .................................. 101/129; 101/484
(58) Field of Classification Search ................ 101/114, 101/115, 116, 123, 124, 127, 128.4, 129, 101/483, 484
    See application file for complete search history.

(56) References Cited

U.S. PATENT DOCUMENTS 4,852,483 A * 8/1989 Bussard ...................... 101/128
5,668,633 A * 9/1997 Cheetam et al. ............ 356/402
6,244,183 B1 * 6/2001 Haney et al. ................ 101/490
6,598,527 B1 * 7/2003 Harper-Smith et al. ..... 101/484

* cited by examiner

Primary Examiner—Ren Yan
(74) Attorney, Agent, or Firm—Reed Smith LLP

(57) ABSTRACT

The present invention provides a method for ensuring image consistency of an image printed onto a plurality of substantially identical objects printed by different vendors at different times and/or locations: The method involves receiving a plurality of inks and a product-printing facilitating kit which provides a three step printing process which may be carried out by multiple vendors to provide the same image on all of the objects. The product-printing facilitating kit comprises a film-positive standard having a black image in a plurality of different tones thereon, a digital file encoding said film-positive standard, a plurality of test-print standards each of said test-print standards having one of said inks printed thereon in a plurality of different tones, and a list of suggested parameters for producing a test film positive and a plurality of test-printed objects.

12 Claims, 4 Drawing Sheets

PRINTING-FACILITATING KIT

BACKGROUND OF THE INVENTION

1. Field of the Invention

The present invention relates to a printing-facilitating kit and particularly to methods and a kit for ensuring image consistency of images printed onto a plurality of objects printed by different vendors.

2. Background

There are many instances where an organization requires consistency in the print quality of printed products, such as compact discs (e.g. CD ROMs), plastic bottles, promotional clothing, signage, or the like. It is often the case that such products are printed by different vendors (i.e. different printers) at different times and/or at different geographical locations.

A large market for such printing activities is in the printing of CD ROMs. By way of example, huge numbers of CD ROMs are printed by internet service providers (ISPs). Typically, an ISP will test market a relatively small number of CD ROMs at certain locations. They will then monitor the take-up rate from their customers. The designs incorporated onto the CD ROMs vary and the take-up rate of the ISP's services are found to vary enormously depending on the design. The most successful designs will then go into mass production. Owing to the huge number of CD ROMs required, the ISP will split the printing across multiple vendors. Although the printed CD ROMs will derive from different vendors, they must all look the same as each other and, in addition, they must look like the test-marketed discs. It has been found that variation in the designs makes an enormous difference to the take-up rate. This provides a significant technical problem for the ink manufacturers and vendors who must endeavor to obtain consistency not only of their own printed CD ROMs but consistency with the master design as well as with the products of the other vendors.

In order to obtain such consistency, ink manufacturers have used a "program" which involves sending to the vendors a precise ink formulation together with pre-printed CD ROM standards against which they check the final print result and a specification of suggested printing parameters. The vendors may then return their test print results to the ink manufacturer if the result is not satisfactory. The ink manufacturer will then assess the test print results and ascertain where the problems in the printing process may lie. Such a program has been adequate for the present line art printing methods. Line art printing methods are well known to the skilled person and involve high-contrast images made from blocks of inks. However, ISPs, as well as other organizations placing large printing orders, now require more complex designs which require process (tonal) printing techniques. However, it has become apparent that the present program for ensuring image consistency does not provide sufficient control for process printing techniques.

SUMMARY OF THE INVENTION

Accordingly, the present invention provides a method for ensuring image consistency of an image printed onto a plurality of substantially identical objects printed at different times and/or locations comprising:

(A) receiving a plurality of inks which have been adapted for printing said image onto said objects; and (B) receiving a product-printing facilitating kit which comprises
  a film-positive standard having a black image in a plurality of different tones thereon,
  a digital file encoding said film-positive standard,
  a plurality of test-print standards each of said test-print standards having one of said inks printed thereon in a plurality of different tones, and
  a list of suggested parameters for producing a test film positive and a plurality of test-printed objects;

(C) carrying out printing steps 1 and 2, in either order, followed by step 3, wherein step 1 comprises the following sub-steps:

(i) using said film-positive standard to make up a screen-printing screen bearing a stencil corresponding to said film-positive standard, (ii) printing from said screen-printing screen using one of said inks to produce a test-printed object, (iii) comparing said test-printed object to the corresponding said test-print standard, (iv) if necessary, running diagnostic tests and adjusting one or more printing parameters, (v) repeating sub-steps (ii) to (iv) until said test-printed object is substantially identical to said test-print standard, (vi) optionally repeating sub-steps (i) to (v) for each of said inks;

step 2 comprises the following sub-steps:

(i) producing said test film positive from said digital file encoding said test film positive, (ii) comparing said test film positive to said supplied film-positive standard, (iii) if necessary, running diagnostic tests and adjusting one or more printing parameters (iv) repeating sub-steps (i) to (iii) until said test film positive is substantially identical to said film-positive standard; and step 3 comprises the following sub-steps:

(i) obtaining a digital file encoding said image which is to be printed, (ii) producing a plurality of film positives corresponding to each of said inks using said parameters obtained from step 2, (iii) using said film positives to make up a plurality of screen-printing screens each bearing a stencil corresponding to said film positives, (iv) printing said image onto said plurality of substantially identical objects using said screen-printing screens, said printing parameters obtained from step 1 and said inks.

This method provides an improved program for obtaining image consistency for an image printed by a number of different vendors. The program disconnects the two parts of the printing process in order to facilitate the diagnosis and correction of problems. This program enables image consistency to be obtained for images printed using process printing.

The present invention also provides a product-printing facilitating kit comprising a film-positive standard having a black image in a plurality of different tones thereon, a digital file encoding said film-positive standard, a plurality of test-print standards each of said test-print standards having one of said inks printed thereon in a plurality of different tones, and a list of suggested parameters for producing a test film positive and a plurality of test-printed objects.

In addition, the present invention provides a printing-facilitating kit comprising a CD ROM carrier; a CD ROM comprising a digital file encoding a film-positive standard, a file containing a list of suggested printing parameters for printing a test film-positive, a file containing a list of suggested printing parameters for printing a test print; a film-positive standard having a plurality of different tones printed thereon; and one or more test-print standard CD ROMs each of said test-print standard CD ROMs having an ink printed thereon in a plurality of different tones.

The present invention also provides a method of obtaining a plurality of printed objects printed by a plurality of vendors all of said printed objects having substantially identical images printed thereon, comprising designing an image, sending said image to an ink manufacturer for formulation of inks suitable for printing said image onto said objects, and sending said image, said inks and a product-printing facilitating kit to said plurality of vendors, wherein said product-printing facilitating kit comprises a film-positive standard having a black image in a plurality of different tones thereon, a digital file encoding said film-positive standard, a plurality of test-print standards each of said test-print standards having one of said inks printed thereon in a plurality of different tones, and a list of suggested parameters for producing a test film positive and a plurality of test-printed objects.

DETAILED DESCRIPTION OF THE INVENTION

Figure 1:
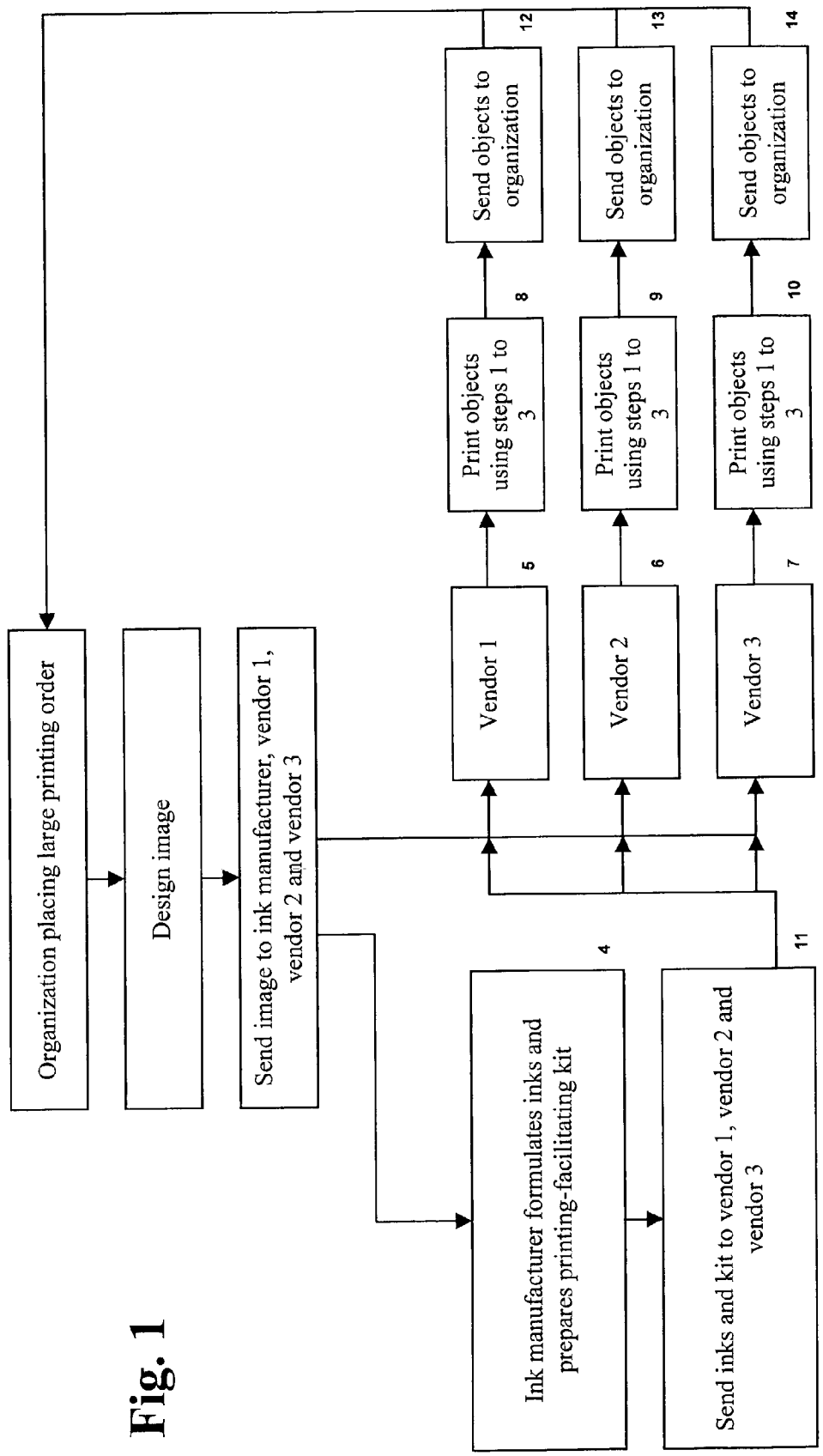
FIG. 1 shows a new system for providing image consistency according to the present invention.

The present invention essentially provides a new program for providing image consistency. FIG. 1 shows how the present program is used. An organization 1 placing large printing orders, such as an ISP, will design an image as shown as 2 for a particular product, such as a CD ROM, plastic bottle, promotional clothing, signage, or the like. A complex image will require screen printing using process printing, typically four-color process printing. The organization placing the order will then send the image, see 3, to an ink manufacturer 4 with instructions to prepare suitable inks as well as to a plurality (exemplified as three but usually more) of vendors 5-7 who will eventually print the image onto the required products, 8-10. In the case of CD ROMs, the image is printed either directly onto a CD ROM or, more usually, onto a CD ROM which has been pre-coated, often with a white coating layer. During the printing steps the vendor(s) may wish to return test prints to the ink manufacturer to aid diagnosis of any problems which may arise. This optional feature is, for reasons of clarity, not shown in FIG. 1.

The ink manufacturer will then make up suitable inks as shown at 11. The composition of the inks will vary depending on a number of variables, such as the substance to be printed on and the environmental conditions at the vendor. Although it is important for the ink to be specifically tailored to the particular application, the precise formulation of the inks will depend on the application. Techniques for formulating inks for a particular application are well-known in the art. Once formulated, the ink manufacturer will send the inks to the vendors together with a program for printing the inks onto the objects. The organization placing the order, who will have designed the image, will typically send the image to the vendors in electronic form. The vendors will then print the image using the program and inks provided by the ink manufacturer and return the objects to the organization placing the order, as shown as 12-14.

Figure 2:
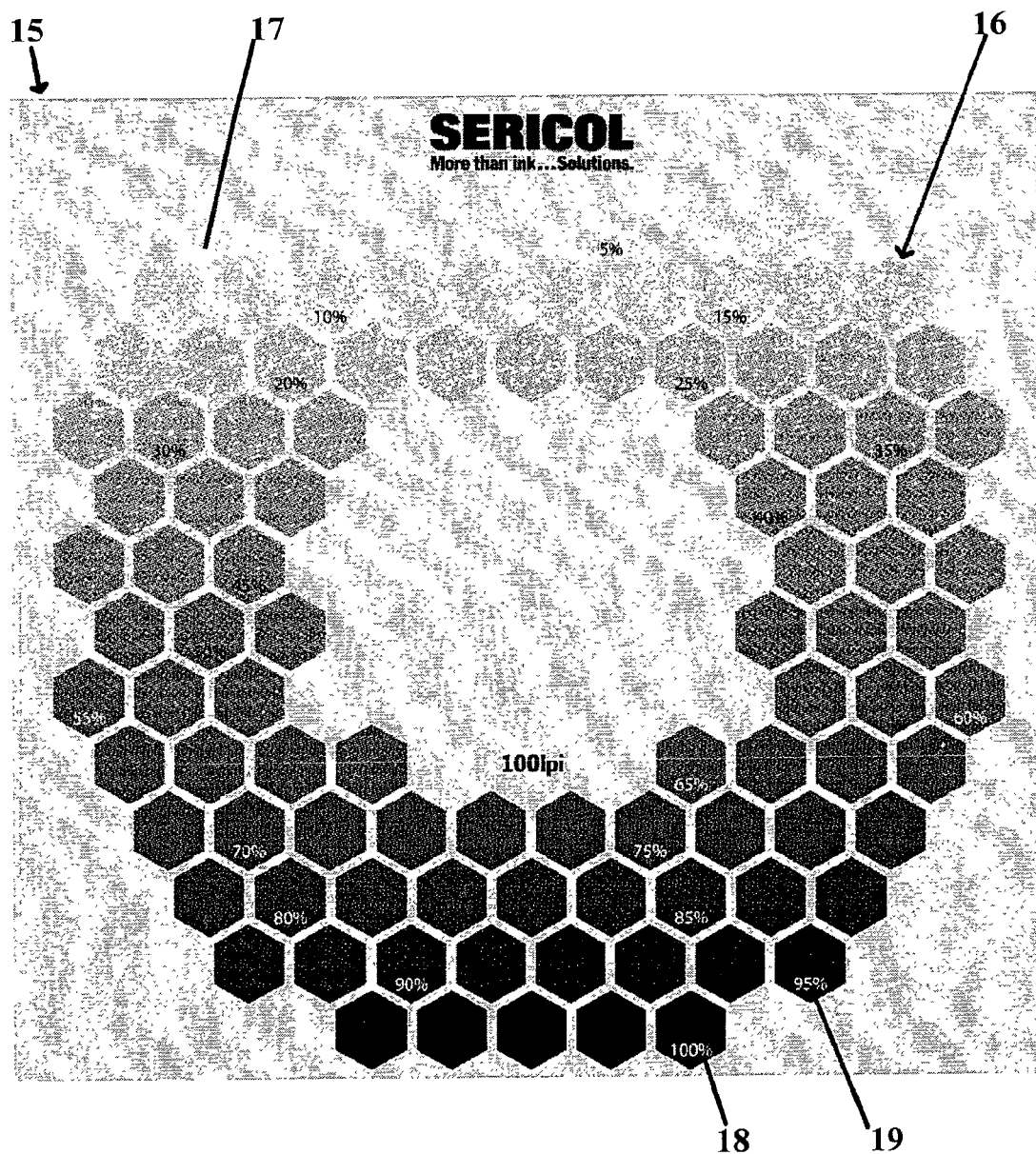
FIG. 2 shows a film-positive standard according to the present invention.
Figure 3:
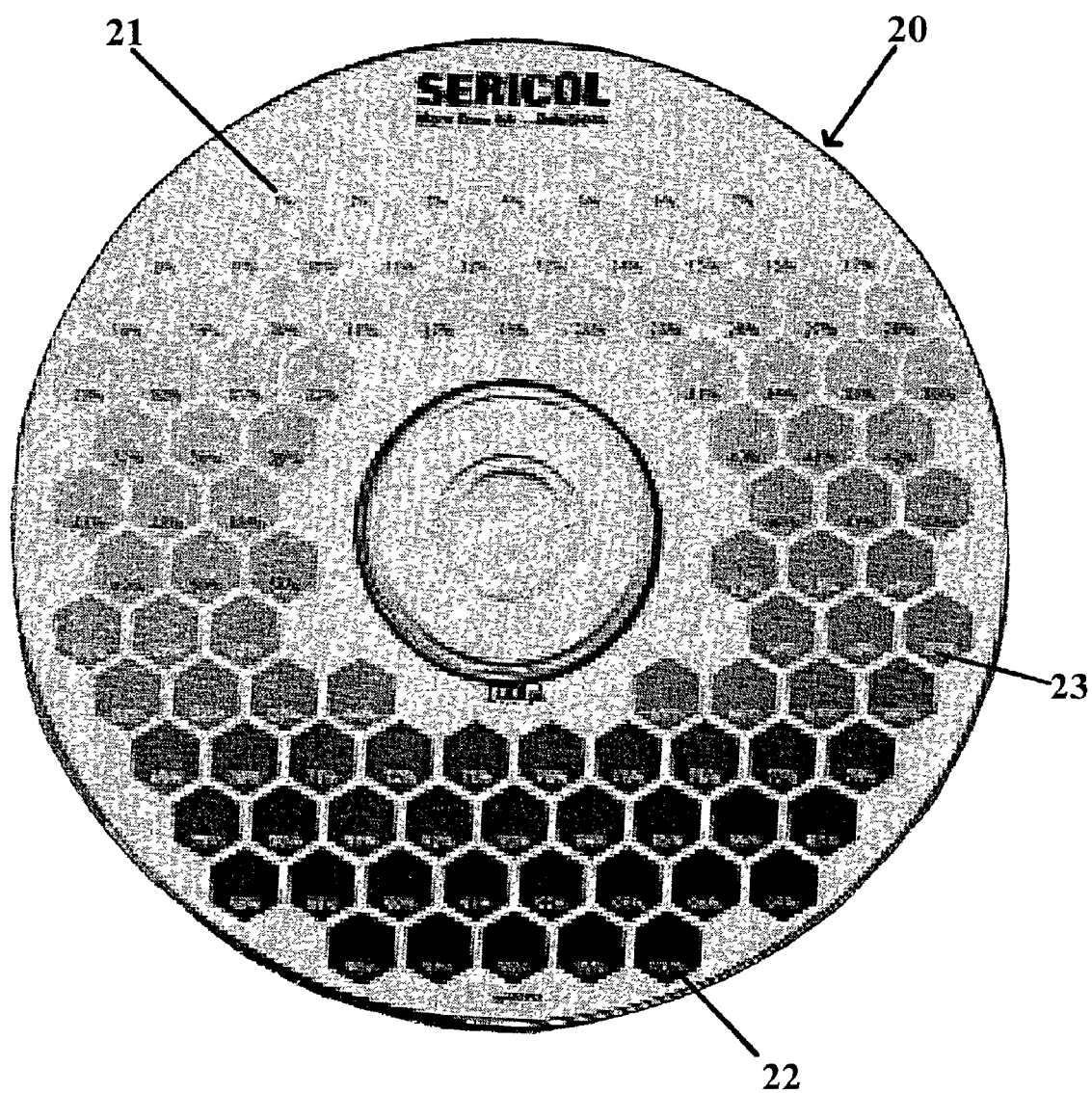
FIG. 3 shows a test-print standard according to the present invention.

The printing steps 1 to 3 shown as 8 to 10 in FIG. 1 will now be described in more detail with reference to FIGS. 2 and 3.

Step 1 of the program involves the standardization of the printing process. In sub-step (i) the vendor will use a film-positive standard which is supplied by the ink manufacturer as part of the program. The film-positive standard incorporates a black image as a plurality of different tones. This image may be printed but, more usually, the image is produced by standard photographic techniques. A specific embodiment of the film-positive standard is shown in FIG. 2. FIG. 2 shows a transparency 15 having a "honeycomb" structure 16 with each hexagon being a different tone. The tonal range varies from 0 to 100% in 1% increments. The hexagons relating to a tonal value of 0 and 100% are shown in FIG. 2 as 17 and 18, respectively. Tonal values are also indicated in some of the hexagons as a percentage value, e.g. "95%" is shown as 19. The supplied film-positive standard is then used to make up a screen-printing screen bearing a stencil corresponding to this film-positive standard. Essentially, the screen-printing screen is coated with a curable composition. The film-positive standard is then used as a mask when the composition is cured. When the film-positive standard is removed, the composition behind the film-positive standard is uncured and may be washed away leaving a stencil. This stencil, which corresponds to the image on the film-positive standard, may then be used for printing. Although such techniques for making up screen-printing screens are known, the present program optionally supplies parameters for optimising this process in the first instance. Such parameters include the mesh type, stencil system and an Rz value (a measure of the flatness of the screen). For example, for printing onto a CD ROM, the screen specification may indicate a mesh of 150.31 (380.31), a stencil system of an emulsion or capillary film coated to give a 3 micron stencil build and an Rz value of 1-3 µm.

In sub-step (ii) the vendor will print onto an object, such as a CD ROM, using the made up screen-printing screen using the ink(s) supplied by the ink manufacturer to produce a test-print result. Typically, black, magenta, cyan and yellow inks will be used. Although techniques for printing using screen-printing screens are known, the present program optionally supplies parameters for optimising this process in the first instance. Such parameters include squeegee blade type, screen tension, snap height and print sequence. For example, for printing onto a CD ROM, the printing specification may indicate a squeegee blade of 85 shore (durometer), a screen tension of 18-22 N, a snap height of 2 CDs and a print sequence specified in an art file. The thus-produced test-print result will then, in sub-step (iii) be compared to the corresponding supplied test-print standards. Such a test-print standard is shown as 6 in FIG. 3. FIG. 3 shows, as 20, a preferred embodiment of a CD ROM as a test-print standard. Where all four colors mentioned above are used, three test-print standards will be supplied corresponding to the magenta, cyan and yellow inks. A test-print standard in black is not required as the film-positive standard, which is black, may be used for this purpose. Alternatively, it would be acceptable to have more than one color on the same CD ROM provided the different colors are printed separately. As shown in FIG. 3, the CD ROM bears the same honeycomb structure as the film-positive standard shown in FIG. 2. Again, this honeycomb structure shows each ink, say magenta, having a tonal range from 0 (shown as 21) to 100% (shown as 22) in 1% increments. Tonal values are also indicated in some of the hexagons as a percentage value, shown as 23. The test-print result and the supplied test-print standard may be compared by the vendor by eye or by using suitable equipment, such as a densitometer.

If necessary, in sub-step (iv) the vendor may run diagnostic tests on the printing machine. Such tests are required if the test-print result does not correspond to the supplied test-print standard. The diagnostic tests will indicate to the vendor, which of the printing parameters require adjustment. The adjustment may be in the screen, such as the application of the stencil, the level of exposure or the products used to make the screen, or in the machine itself, such as the pressures applied to the squeegee, or the angle or speed of the squeegee. After making the necessary adjustments, the vendor will re-run the printing process to produce a second test-print result. This second test-print result will then be compared to the supplied test-print standard as indicated above in sub-step (iii). The sub-steps of comparing the test-print result to the supplied test-print standard, running diagnostic tests and adjusting one or more of the printing parameters are carried out until the test-print result is substantially identical to the corresponding supplied test-print standard. Step 1 is then repeated for any of the other color inks.

If required, the vendor may wish to contact the ink manufacturer to fine tune the printing process. For this purpose, the program may also include a list of contact details for the required personnel at the ink manufacturer.

Step 2 involves the standardisation of the film positive output process. This step is required to ensure that the vendor is able to prepare a film positive of the image supplied by the organization placing the large printing order, such as the ISP.

In sub-step (i) the vendor will print a test film positive from a digital file in coding the test film positive which is incorporated in the program. Optionally, the program will also provide the vendor with a range of parameters, such as the density, resolution, dot shape, LPI, tonal range, screen angle and print sequence required for correctly printing a test film positive. For example, for CD ROMs, the printing specification may indicate a density of less than 0.05 for clear areas and greater than 4.0 for black areas, a resolution of between 2000 and 2540, an elliptical dot shape, an LPI of 100 lpi, a tonal range of 15-90%, a screen angle of 45°, and a print sequence specified on an art file. In sub-step (ii) the vendor compares the test film positive which has been printed to the supplied film-positive standard which is shown as 15 in FIG. 2. As above, if necessary, in sub-step (iii) the vendor will run diagnostic tests and adjust one or more of the printing parameters in order to obtain a test film positive which is substantially identical to the supplied film-positive standard. Again, the vendor will re-run the diagnostic tests and make the necessary adjustments until the required printing quality is achieved (sub-step (iv)).

The results of steps 1 and 2 are a standardized print process and a standardized film output process. These steps may be carried out in either order although, preferably, step 1 precedes step 2. Once steps 1 and 2 have been carried out, the vendor will print the image supplied on a digital file by the organization placing the order, such as the ISP, using the ink supplied by the ink manufacturer and the process parameters obtained according to the program. Specifically, as set out in step 3, the final print run will comprise sub-steps (i)-(iv).

In sub-step (i) of step 3 the vendor will obtain a digital file encoding the image to be printed from the organization placing the order, such as the ISP. In sub-step (ii) the vendor will produce film positives of the image using the printing parameters obtained in step 2. A different film positive will now be required for each color since, in the final image, the placement of different colors will vary depending on the overall colors required in the design. In sub-step (iii) the vendor will use these film positives to make up screen-printing screens each bearing a stencil corresponding to these film positives. Using the parameters obtained from step 2, the vendor may be confident that the film positives are of sufficient quality to generate the required stencil on the screen-printing screens. In sub-step (iv) the vendor prints the image onto the plurality of substantially identical objects, such as the pre-coated or uncoated CD ROMs, using the printing parameters obtained from step 1 and using the inks as supplied by the ink manufacturer and as used in step 1. Usually all four colors will be used although some designs may incorporate fewer colors. In order to avoid interference between the different colors, the different colors are printed at different angles. The program optionally includes suggested parameters. For example, these may be screen angles of 15 or 105° for cyan/halftone blue, 75 or 165° for magenta/halftone red, 90 or 0° for yellow/halftone yellow and 45° for black/halftone black.

A key feature of the present invention is that all of the vendors instructed by the organization placing the printing order will use the same program. In this manner, the organization placing the printing order may be sure that image consistency across all of the vendors will be obtained. The objects are then sent back to the organization placing the printing order.

The phrase "substantially identical" is used herein with reference to the comparison of the print runs in steps 1 and 2 with the standards as well as in relation to the objects used. In the former, it indicates that a difference cannot be detected by the human eye and in the latter it indicates that the same object is used to the extent that they will require the same inks for printing, e.g. CD ROMs with a white pre-coat or T-shirts of the same colour and material etc.

In order to put the present invention into practice, the ink manufacturer will provide the vendors will a product-printing facilitating kit. This kit will include a film-positive standard as exemplified in FIG. 2 as well as a digital file encoding a film-positive standard. The kit will also include a list of suggested printing parameters for printing a test film positive. The kit will also include one or more test print standards as exemplified in FIG. 3 and a list of suggesting printing parameters for printing a test print. In addition to the kit, the vendor will also be supplied with one or more inks which have been adapted for printing a particular image onto a particular substrate.

Figure 4:
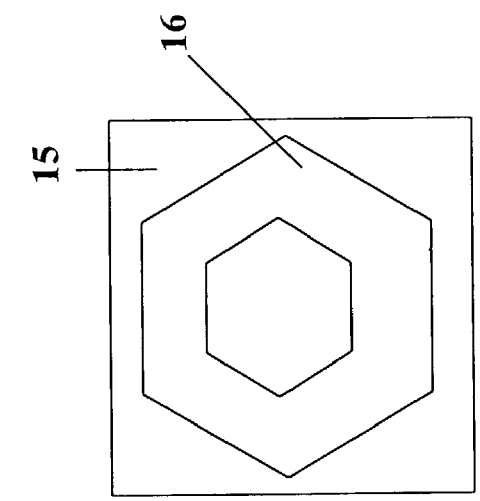
FIG. 4 shows a product-printing facilitating kit used for printing CD ROMs according to the present invention.
Figure 4:
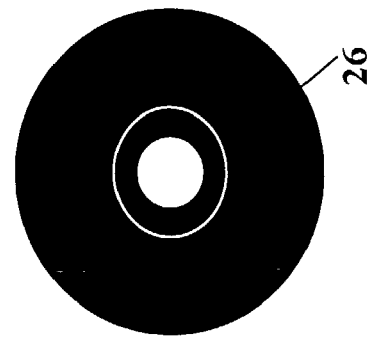
Figure 4:
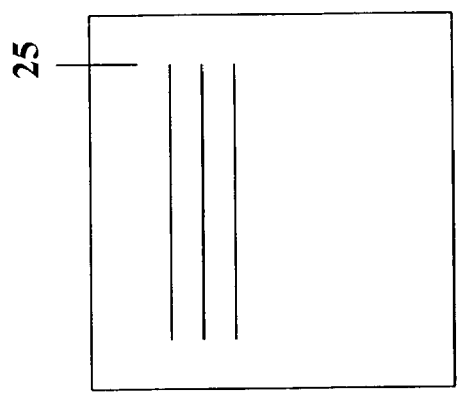
Figure 4:
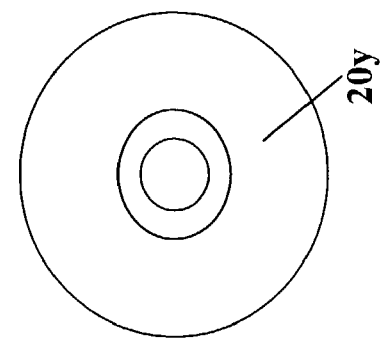
Figure 4:
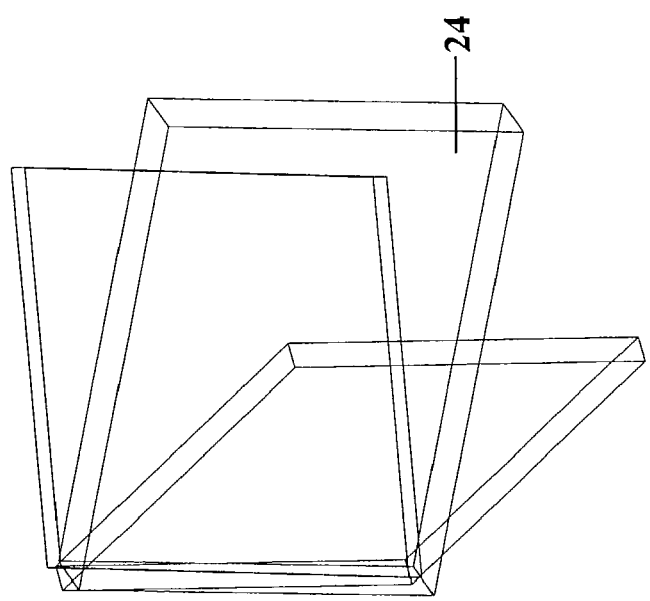
Figure 4:
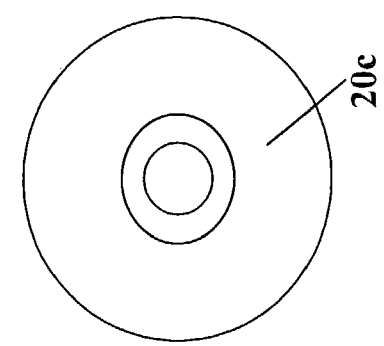
Figure 4:
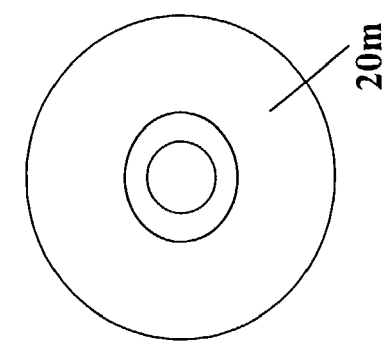

In one embodiment of the present invention, the organization placing the large printing order is an ISP and the objects to be printed are CD ROMs. In this case the test-print standards are also CD ROMs each printed with one of the inks, see FIG. 4. Accordingly, the product-printing facilitating kit may be conveniently included in a CD ROM carrier 24. The CD ROM carrier will contain a booklet 25 providing an overview of the program. It will also include a CD ROM 26 encoding the digital art which creates the film-positive standard 15. It will also include details of the diagnostics which are required as well as a contact list of personnel at the ink manufacturer. The carrier will also include, preferably, three test-print standards 20 in magenta, cyan and yellow, shown as 20m, 20c and 20y, respectively, in FIG. 4.

What is claimed is:

1. A method for ensuring image consistency of an image printed onto a plurality of substantially identical objects printed at different times and/or locations comprising:
   (A) receiving a plurality of inks which have been adapted for printing said image onto said objects; and
   (B) receiving a product-printing facilitating kit which comprises
   a film-positive standard having a black image in a plurality of different tones thereon,
   a digital file encoding said film-positive standard,
   a plurality of test-print standards each of said test-print standards having one of said inks printed thereon in a plurality of different tones, and
   a list of suggested parameters for producing a test film positive and a plurality of test-printed objects;
   (C) carrying out printing steps 1 and 2, in either order, followed by step 3, wherein step 1 comprises the following sub-steps:
   (i) using said film-positive standard to make up a screen-printing screen bearing a stencil corresponding to said film-positive standard,
   (ii) printing from said screen-printing screen using one of said inks to produce a test-printed object,
   (iii) comparing said test-printed object to the corresponding said test-print standard,
   (iv) if necessary, running diagnostic tests and adjusting one or more printing parameters,
   (v) repeating sub-steps (ii) to (iv) until said test-printed object is substantially identical to said test-print standard,
   (vi) optionally repeating sub-steps (i) to (v) for each of said inks;
   step 2 comprises the following sub-steps:
   (i) producing said test film positive from said digital file encoding said test film positive,
   (ii) comparing said test film positive to said supplied film-positive standard,
   (iii) if necessary, running diagnostic tests and adjusting one or more printing parameters
   (iv) repeating sub-steps (i) to (iii) until said test film positive is substantially identical to said film-positive standard; and
   step 3 comprises the following sub-steps:
   (i) obtaining a digital file encoding said image which is to be printed,
   (ii) producing a plurality of film positives corresponding to each of said inks using said parameters obtained from step 2,
   (iii) using said film positives to make up a plurality of screen-printing screens each bearing a stencil corresponding to said film positives,
   (iv) printing said image onto said plurality of substantially identical objects using said screen-printing screens, said printing parameters obtained from step 1 and said inks.

2. The method as claimed in claim 1, wherein said plurality of substantially identical objects are CDs.

3. The method as claimed in claim 1, wherein said plurality of substantially identical objects are printed by different vendors.

4. The method as claimed in claim 1, wherein step 1 precedes step 2.

5. The method as claimed in claim 1, wherein said supplied film positive standard incorporates a tonal range from 0 to 100%.

6. The method as claimed in claim 5, wherein said supplied film positive standard incorporates a tonal range from 0 to 100% in 1% increments.

7. The method as claimed in claim 1, wherein said screen-printing screen made up in step 1, sub-step (i), is made up according to supplied parameters which include any of Rz value, mesh type and stencil system.

8. The method as claimed in claim 1, wherein printing carried out in one or both of steps 1 and 3 is process printing.

9. The method as claimed in claim 1, wherein said inks are black, magenta, cyan and yellow and said test-print standards are magenta, cyan and yellow.

10. The method as claimed in claim 9, wherein said inks are formulated for printing onto CD ROMs.

11. The method as claimed in claim 1, wherein said printing in step 1, sub-step (ii), is carried out according to supplied parameters which include any of squeegee blade type, screen tension, snap height and print sequence.

12. The method as claimed in claim 1, wherein said printing in step 1, sub-step (ii), is carried out according to supplied parameters which include any of density, resolution, dot shape, LPI, tonal range, screen angles and print sequence.

* * * * *